(12) United States Patent
Maeda et al.

(10) Patent No.: US 11,198,172 B2
(45) Date of Patent: Dec. 14, 2021

(54) METHOD AND DEVICE FOR JOINING MEMBERS

(71) Applicant: KOBE STEEL, LTD., Hyogo (JP)

(72) Inventors: Yasuhiro Maeda, Kobe (JP); Toru Hashimura, Kobe (JP); Kenichi Watanabe, Kobe (JP); Takayuki Kimura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 259 days.

(21) Appl. No.: 16/488,562

(22) PCT Filed: Mar. 14, 2018

(86) PCT No.: PCT/JP2018/009924
§ 371 (c)(1),
(2) Date: Aug. 23, 2019

(87) PCT Pub. No.: WO2018/180488
PCT Pub. Date: Oct. 4, 2018

(65) Prior Publication Data
US 2020/0246860 A1 Aug. 6, 2020

(30) Foreign Application Priority Data
Mar. 27, 2017 (JP) .............................. JP2017-061660

(51) Int. Cl.
*B21D 39/06* (2006.01)
*B21D 39/04* (2006.01)
(Continued)

(52) U.S. Cl.
CPC ........... *B21D 39/06* (2013.01); *B21D 39/044* (2013.01); *B21D 39/046* (2013.01);
(Continued)

(58) Field of Classification Search
CPC .... B21D 39/038; B21D 39/04; B21D 39/044; B21D 39/06; B21D 39/20; B21D 39/203; B21D 39/206; B21D 39/046
See application file for complete search history.

(56) References Cited

U.S. PATENT DOCUMENTS

2012/0267908 A1    10/2012  Kokubo et al.
2018/0015527 A1     1/2018  Maeda et al.
(Continued)

FOREIGN PATENT DOCUMENTS

DE           4008642 A1    11/1990
DE   10 2013 105 481 A1    12/2014
(Continued)

OTHER PUBLICATIONS

Notification of Transmittal of Translation of the International Preliminary Report on Patentability and Translation of Written Opinion of the International Searching Authority; PCT/JP2018/009924; dated Oct. 10, 2019.
(Continued)

*Primary Examiner* — Jermie E Cozart
(74) *Attorney, Agent, or Firm* — Studebaker & Brackett PC

(57) ABSTRACT

A method for joining members according to the present invention includes: providing a first member, a second member, a guide shaft member, a rubber member, a first plunger, a second plunger, and a drive mechanism; inserting the second member into a hole portion of the first member; inserting the guide shaft member into a through-hole of the rubber member; inserting the rubber member, into which the guide shaft member is inserted, inside the second member; arranging an assembly in which the first member, the second member, the rubber member, and the guide shaft member so as to horizontally extend; arranging the assembly so as to be sandwiched by the first plunger and the second plunger; and
(Continued)

moving the second plunger toward the first plunger; compressing the rubber member by the first plunger and the second plunger in a direction where the guide shaft member extends, and expanding the rubber member radially outside the guide shaft member; and thus expanding and deforming at least a portion of the second member that is inserted into the hole portion to join the portion to the first member by press-fitting.

15 Claims, 19 Drawing Sheets

(51) Int. Cl.
*B21D 39/20* (2006.01)
*B60R 19/04* (2006.01)
*B21D 26/14* (2006.01)
*B60R 19/24* (2006.01)
*B60R 19/18* (2006.01)
*B21D 39/03* (2006.01)

(52) U.S. Cl.
CPC ............ *B21D 39/206* (2013.01); *B60R 19/04* (2013.01); *B21D 26/14* (2013.01); *B21D 39/038* (2013.01); *B21D 39/04* (2013.01); *B21D 39/20* (2013.01); *B21D 39/203* (2013.01); *B60R 19/24* (2013.01); *B60R 2019/1826* (2013.01)

(56) References Cited

U.S. PATENT DOCUMENTS

| 2019/0210088 A1 | 7/2019 | Maeda et al. |
| 2019/0210089 A1 | 7/2019 | Maeda et al. |

FOREIGN PATENT DOCUMENTS

| GB | 2 291 368 A | 1/1996 |
| JP | S51-133170 A | 11/1976 |
| JP | S52-98672 A | 8/1977 |
| JP | S58-184025 A | 10/1983 |
| JP | S60-257935 A | 12/1985 |
| JP | H07-323343 A | 12/1995 |
| JP | 2004-237320 A | 8/2004 |
| JP | 2007-284039 A | 11/2007 |
| JP | 2011-105302 A | 6/2011 |
| WO | 2016/125507 A1 | 8/2016 |

OTHER PUBLICATIONS

The extended European search report issued by the European Patent Office dated Nov. 30, 2020, which corresponds to European Patent Application No. 18774830.6-1016 and is related to U.S. Appl. No. 16/488,562.

METHOD AND DEVICE FOR JOINING MEMBERS

CROSS-REFERENCE TO RELATED APPLICATIONS

This is a national phase application in the United States of International Patent Application No. PCT/JP2018/009924 with an international filing date of Mar. 14, 2018, which claims priority of Japanese Patent Application No. 2017-061660 filed on Mar. 27, 2017 the contents of which are incorporated herein by reference.

TECHNICAL FIELD

The present invention relates to a method and a device for joining members.

BACKGROUND ART

High-strength thin steel sheets referred to as high-tension steels are used to reduce weight and improve safety of vehicles. Although the high-tension steels are effective in reducing weight and improving safety, they are still heavier than low-density materials such as aluminum. In addition, high strength of high-tension steel causes problems such as a decrease in formability, an increase in forming load, and a decrease in dimensional accuracy. In order to solve these problems, in recent years, there has been multi-materialization in which extrusion molded products, cast products, and press molded products using aluminum having a specific gravity smaller than that of steel sheets are used together with steel components.

A problem in this multi-materialization is the joining of steel components and aluminum components. Welding techniques represented by spot welding produce fragile intermetallic compounds (IMC) at the interface between steel components and aluminum components, and hence joining techniques such as electromagnetic forming joining, screw fastening represented by bolts and nuts, friction stir joining (FSW), rivets, self-piercing rivets (SPR), mechanical clinching, and bonding have been put into practical use.

In swaging by electromagnetic forming, a solenoid forming coil is inserted inside a pipe-shaped component fitted to a mating component, and an induced current is induced in a pipe of a conductor by a magnetic field that changes by applying an impact current to the coil. An electromagnetic force is generated between a magnetic field due to the primary current of the coil and an induced current flowing in the opposite direction to the circumferential direction of the pipe, and at this time, the pipe is subjected to a radially outward force, so that it is expanded and deformed, and is joined to the mating component by press-fitting. This joining method is suitable for copper and aluminum having high electrical conductivity, and is also practically used in joining of some automobile components.

JP 2007-284039 A discloses a swaging and joining technique by electromagnetic forming for multi-materialization. Specifically, a metal bumper reinforcement with a hollow cross section is expanded and deformed by electromagnetic forming, and is fitted and joined to a hole portion provided in an aluminum bumper stay.

The electromagnetic forming disclosed in JP 2007-284039 A is suitable for swaging and joining hollow components made of copper or aluminum, which has good electric conductivity, to mating components. In addition, the cross-sectional shape of the hollow components is preferably circular in view of the joining mechanism.

However, in the joining by electromagnetic forming of JP 2007-284039 A, the solenoid coil that is used needs to be smaller than the inner diameter of the aluminum component (aluminum pipe). If the diameter of the solenoid coil is to be reduced in conjunction with the joining of small-diameter components, it is difficult to manufacture the solenoid coil, and there may be problems in terms of performance and durability. In particular, it becomes difficult to form a conducting wire into the shape of a solenoid coil, and restrictions on the material and cross-sectional shape of the conducting wire become severe, and the cross section of the conducting wire is deformed when the conducting wire is formed into the shape of a solenoid coil. In addition, equipment such as a large-capacity, high-voltage capacitor is required. Furthermore, it is difficult to join aluminum components having a rectangular cross section, a hole, or a slit.

The restriction on the shape of the member is not limited to the case of electromagnetic forming. For example, even in the case of other joining by press-fitting, for example, in the case of a long member as a shape of the member, when a press machine is used for the joining by press-fitting, a limit stroke exists in the press machine, and hence it is often impossible to place the long member in the joining device.

An object of the present invention is to provide a method and a device for joining members that can reduce the load on each member, improve the joining strength, and join two members at low cost even to a long member in particular, without being restricted in shape and material.

Means for Solving the Problems

A method for joining members according to the present invention includes: providing a first member that is provided with a hole portion, a second member that is hollow in shape, a guide shaft member, an elastic body that has a through-hole through which the guide shaft member can be inserted, a first plunger that has a through-hole through which the guide shaft member can be inserted, a second plunger to which the guide shaft member is connected, and a drive mechanism that drives the guide shaft member; inserting the second member into the hole portion of the first member; inserting the guide shaft member into the through-hole of the elastic body; inserting the elastic body, into which the guide shaft member is inserted, inside the second member; arranging an assembly in which the first member, the second member, the elastic body, and the guide shaft member are combined so as to horizontally extend; arranging the assembly so as to be sandwiched by the first plunger and the second plunger in the direction where the guide shaft member extends; and moving the second plunger connected to the guide shaft member toward the first plunger by driving the guide shaft member by the drive mechanism in a state where the first plunger is fixed, compressing the elastic body by the first plunger and the second plunger in a direction where the guide shaft member extends, and expanding the elastic body radially outside the guide shaft member, thereby expanding and deforming at least a portion of the second member that is inserted into the hole portion to join the second member to the first member by press-fitting.

According to this method, by expanding the elastic body to uniformly expand and deform the second member, it is possible to prevent local deformation and reduce the load on each member. This is because the second member can be uniformly deformed due to the isotropic deformability of the elastic body. Accordingly, the fitting accuracy is improved, and the joining strength can be improved. The above method is also advantageous compared with electromagnetic forming and other processing methods. Electromagnetic forming can only be used for conductive materials and has restriction depending on the coil used in terms of the cross-sectional shape and dimensions as described above. On the other hand, this method does not depend on the material and has no restrictions on the cross-sectional shape and dimensions. Furthermore, electrical equipment requiring a large-capacity capacitor is not necessary, and the two members can be joined at low cost. In addition, since the above-mentioned assembly is arranged horizontally, it is not difficult to handle the second member such as a long pipe that is difficult to manage. Here, the term "horizontal direction" or "horizontally" includes not only the strict horizontal direction but also tilt directions that can be determined to be substantially horizontal. Furthermore, since the first plunger is fixed, applying a force only to the second plunger can compress the elastic body in the direction where the guide shaft member extends, and hence the elastic body can be compressed from both sides by one drive mechanism.

The drive mechanism may further includes a cam mechanism that converts a force applied in a direction different from the direction where the guide shaft member extends into a force in the direction where the guide shaft member extends, and may compress the elastic body with the force whose direction has been converted by the cam mechanism.

According to this method, the cam mechanism can convert a force applied in a direction different from the direction where the guide shaft member extends (horizontal direction) into a force in the direction where the guide shaft member extends. Normally, a processing machine such as a press machine that applies a compression force applies a compression force in the vertical direction. The cam mechanism can convert a vertical force applied by a processing machine such as the normal press machine into a horizontal force. In the above method, since the above assembly is arranged horizontally, a processing machine such as the normal press machine can be used owing to the cam mechanism, while preventing the handling of a long member for example, from becoming difficult, so that the assembly can be easily joined. Furthermore, when the second member is a long member, since a limit stroke is defined in a normal facility that vertically applies a compression force, there is a possibility that the swaging and joining cannot be performed due to the limitation of dimensions. However, in the above method, since the cam mechanism can convert the direction where the force acts, the swaging and joining can be performed without being subjected to dimension restriction.

The drive mechanism may include a biasing portion that biases the guide shaft member and the second plunger in a direction where compression of the elastic body is released, and when the drive of the guide shaft member by the drive mechanism is released after the compression of the elastic body, the guide shaft member and the second plunger may be returned to the positions before the compression by a biasing force of the biasing portion.

According to this method, since the second plunger is automatically returned to the original position by the biasing portion, it is not necessary to manually return the second plunger to the original position, and workability can be improved.

A ball screw structure is provided between the guide shaft member and the second plunger, and the drive mechanism may move the second plunger toward the first plunger with the ball screw structure by rotating and driving the guide shaft member.

According to this method, since the ball screw structure is provided, a rotary drive type can be used as the drive mechanism. When a rotary drive type is used as the drive mechanism, it is not necessary to secure the stroke length as in a press machine. Accordingly, the second member can be reliably joined regardless of its length, and the equipment for joining can be reduced in size.

The second member is provided with a partition wall that extends in the longitudinal direction of the second member and partitions the internal space of the second member, and the elastic body, the guide shaft member, the first plunger, and the second plunger may be provided each corresponding to the number of the internal spaces partitioned by the partition wall.

According to this method, since a plurality of elastic bodies are used for joining by press-fitting, it is possible to prevent concentration of stress due to deformation and reduce the load on the first member and the second member. Since the rigidity of the second member can be improved by the partition wall, the strength of joined body when joined can be improved. This method is effective when applied to a joined body that requires high strength and reliability, such as a bumper of a vehicle.

A motion mechanism that horizontally moves the guide shaft member may be further provided, and the motion mechanism may horizontally move the guide shaft member, so that the guide shaft member and the elastic body inserted through the guide shaft member may be inserted inside the second member.

According to this method, since the motion mechanism horizontally moves the guide shaft member, the guide shaft member and the elastic body can be reliably inserted into the second member. As a result, it is possible to reduce the difficulty in handling, in particular, the guide shaft member and the elastic body that have a large weight or dimension.

The inner shape of the hole portion of the first member and the outer shape of the second member may be similar in shape.

According to this method, the second member can be uniformly expanded and deformed to be joined to the first member by press-fitting due to the similar relationship as described above, and local load on the first member and the second member can be prevented.

An outer frame mold may be arranged outside the second member, and at least a part of the second member may be formed along the outer frame mold to be joined by press-fitting.

According to this method, the outer shape of the second member can be deformed into an arbitrary shape by using outer frame molds having various inner shapes. The shape to be deformed can be appropriately selected from the viewpoint of component performance, and can be deformed into a shape in accordance with the application.

The elastic body may be separated at a joint portion between the first member and the second member.

According to this method, since the elastic body is separated at the joint portion, an unintended deformation of the joint portion can be prevented. The unintended deformation means a deformation of the first member. In the joining by press-fitting, the second member is expanded, deformed, and pressed against the first member thereby being joined to the first member. At this time, the first member may be deformed by being subjected to a force from the second member. That is, it is preferable that the first member is not subjected to a force at the joint portion. Therefore, as in the above method, by separating the elastic body so that the elastic body is not arranged near the joint portion, the second member is less likely to be subjected to the expansion and deformation force from the elastic body near the joint portion, and is less likely to expand and deform near the joint portion. Accordingly, the first member is less likely to be subjected to the force from the second member near the joint portion, and the shape of the joint portion can be maintained.

A device for joining members of the present invention is a device for joining members. The device uses an elastic body that has a through-hole to join a first member that is provided with a hole portion and a second member that is hollow in shape by press-fitting. The device includes:

a guide shaft member that can be inserted into the through-hole of the elastic body;

a first plunger that has a through-hole through which the guide shaft member is inserted, the first plunger having a fixed position and a first pressing surface with a flat shape;

a second plunger that is connected to the guide shaft member, the second plunger having a movable position and a second pressing surface that has a flat shape and is opposed to the first pressing surface; and a drive mechanism that drives the guide shaft member to move the second plunger toward the first plunger.

According to this configuration, the first member and the second member can be easily joined by press-fitting in accordance with the following usage. First, an assembly in which the second member is inserted into the hole portion of the first member and an elastic body is inserted inside the second member is arranged between the first plunger and second plunger. In a state where the guide shaft member is inserted into the through-hole of the elastic body, by the drive mechanism driving the guide shaft member, the second plunger connected to the guide shaft member is moved toward the first plunger. Then, the elastic body is compressed by the first and second plungers in the direction where the guide shaft member extends to expand radially outward of the guide shaft member, thereby expanding and deforming at least a portion of the second member inserted into the hole portion to join the second member to the first member by press-fitting.

According to the present invention, by expanding the elastic body from the inside toward the outside to uniformly deform and expand the second member, it is possible to prevent local deformation and reduce the load on each member. Accordingly, the fitting accuracy is improved, and the joining strength can be improved. In addition, the method is simpler than that of electromagnetic forming or other processing methods, and the two members can be joined at low cost without being restricted in shape or material. In particular, since the second member can be arranged horizontally, even a long member can be joined.

MODE FOR CARRYING OUT THE INVENTION

Embodiments of the present invention will be described below with reference to the accompanying drawings. The following embodiments each relate to a method for joining members that joins a first member 10 and a second member 20 using a rubber member (elastic body) 32. In each of the following embodiments, the materials of the first member 10 and the second member 20 are not particularly limited, and the method for joining members according to the embodiments of the present invention can be applied to any material.

First Embodiment

Figure 1A:
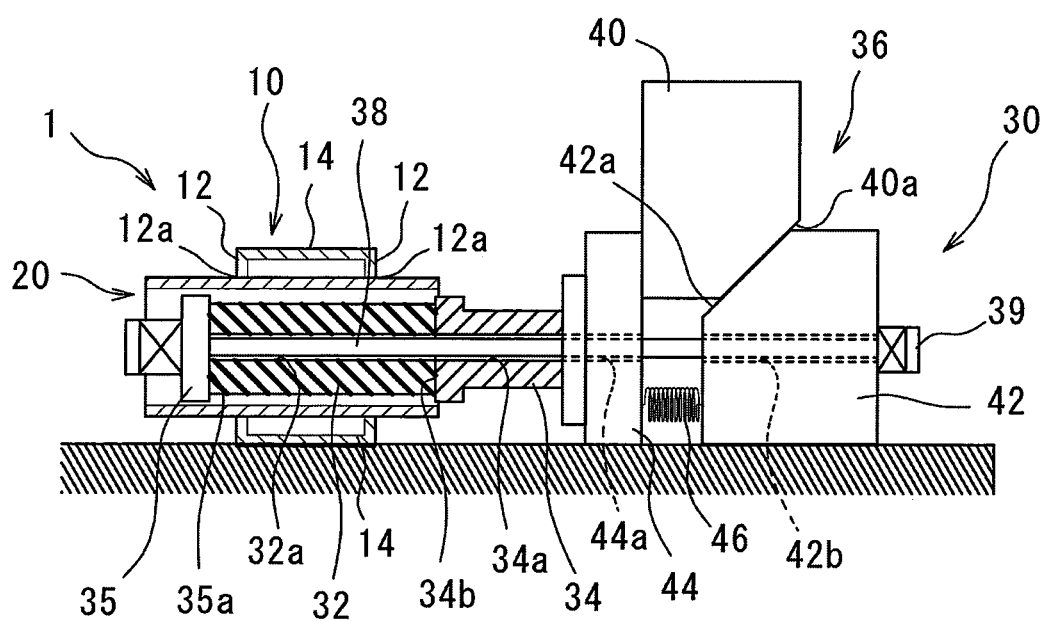
FIG. 1A is a partial sectional view before joining by a method for joining members according to a first embodiment of the present invention.
Figure 1B:
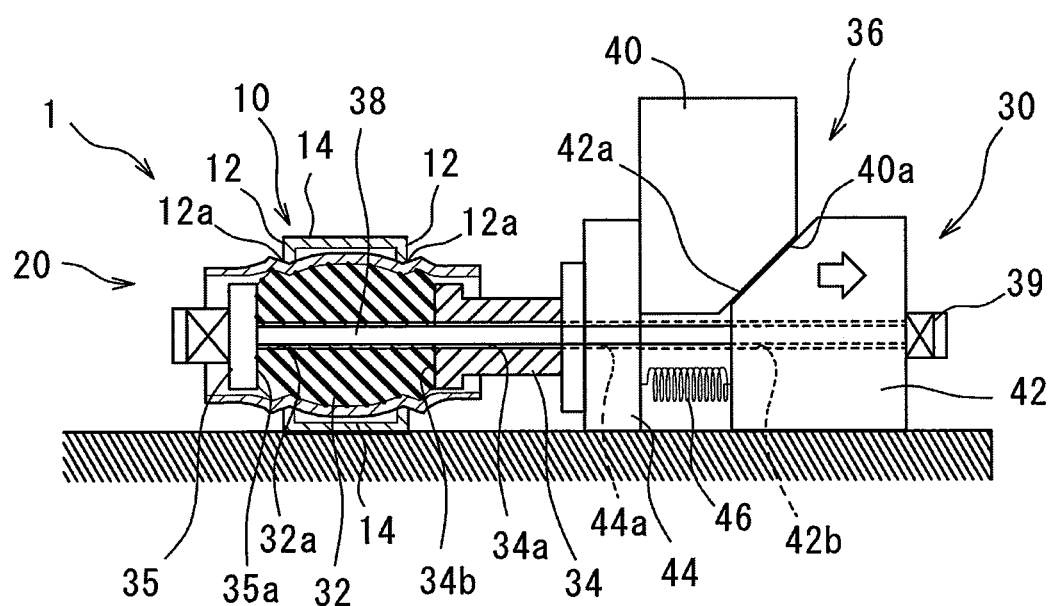
FIG. 1B is a partial sectional view after joining by the method for joining members according to the first embodiment of the present invention.

As shown in FIGS. 1A and 1B, a swaging and joining device 30 includes a guide shaft member 38, a first plunger 34, a second plunger 35, and a drive mechanism 36. The guide shaft member 38 is a rod-like member that extends horizontally. Here, the term "horizontal direction" or "horizontally" includes not only the strict horizontal direction but also tilt directions that can be determined to be substantially horizontal. The first plunger 34 is generally cylindrical, has a circular through-hole 3 through which the guide shaft member 38 is inserted, and has a first pressing surface 34b having a flat shape. The first plunger 34 of the present embodiment is attached to a standing wall portion 44 whose position is fixed. That is, the position of the first plunger 34 is fixed. The standing wall portion 44 is provided with a through-hole 4 that has the same shape as and is concentric with the through-hole 3 of the first plunger 34. As described later, the guide shaft member 38 is inserted into the through-holes 3 and 4. The second plunger 35 is generally cylindrical in shape, is connected with the guide shaft member 38, and has a second pressing surface 35a that has a flat shape and faces the first pressing surface 34b at the time of swaging and joining. Unlike the first plunger 34, the second plunger 35 of the present embodiment is connected with the guide shaft member 38, and hence the second plunger is moved along with the guide shaft member 38. Accordingly, in the configuration of the swaging and joining device 30, when the guide shaft member 38 is pushed and pulled in the longitudinal direction, the guide shaft member 38 slides in the through-hole 3 of the first plunger 34 and the through-hole 4 of the standing wall portion 44, and moves the second plunger 35 connected to the tip end.

The first member 10 is hollow, more specifically circular, and is arranged so as to extend horizontally in the same direction as the guide shaft member 38.

The second member 20 is a rectangular cross section tube in shape, and is arranged so as to extend horizontally and in a direction orthogonal to the guide shaft member 38. The second member 20 includes an end wall 12 provided with two hole portions 12a penetrating in the direction where the guide shaft member 38 extends, and two side walls 14 connecting the two end walls 12.

The rubber member 32 is cylindrical in shape, and provided in its center with a through-hole 32a for inserting the guide shaft member 38. The rubber member 32 is arranged so as to extend horizontally in the same direction as the guide shaft member 38, and is supported by the guide shaft member 38 by inserting the guide shaft member 38 into the through-hole 32a, thereby maintaining the posture and position. The rubber member 32 is preferably made of, for example, any of urethane rubber, chloroprene rubber, CNR rubber (chloroprene rubber and nitrile rubber), and silicon rubber. The hardness of these rubber members 32 is preferably 30 or more in Shore A.

The drive mechanism 36 includes a cam driver 40 and a cam slider 42. The cam driver 40 is adjacent to the standing wall portion 44 and is arranged on the opposite side of the standing wall portion 44 from the second plunger 35. The cam driver 40 is movable vertically along the standing wall portion 44 and has an inclined surface 40a at its lower portion for transmitting a force to the cam slider 42. For the cam driver 40, a press machine or the like that is usually used for pressing or the like may be used. The cam slider 42 has a rail mechanism (not shown) on its lower surface and is movable horizontally. However, other than the rail mechanism, it is possible to adopt any mechanism such as a wheel that reduces the frictional force with the ground when moving. The cam slider 42 has an inclined surface 42a on its upper portion for receiving a force from the cam driver 40. Therefore, the inclined surface 40a of the cam driver 40 and the inclined surface 42a of the cam slider 42 are formed so as to be inclined with respect to each other. The cam slider 42 has a through-hole 42b through which the guide shaft member 38 is inserted. The through-hole 42b of the cam slider 42 is provided with a through-hole 4 that has the same shape as and is concentric with the through-hole 3 of the first plunger 34 and the through-hole 4 of the standing wall portion 44. Therefore, the guide shaft member 38 can be inserted into the through-hole 42b of the cam slider 42, the through-hole 3 of the first plunger 34, and the through-hole 4 of the standing wall portion 44.

When a vertical force (downward in the figure) is applied to the cam driver 40, the force is transmitted from the cam driver 40 to the cam slider 42 via the inclined surfaces 40a and 42a. As a result, the cam driver 40 moves vertically (downward in the figure) and the cam slider 42 moves horizontally (rightward in the figure) along the guide shaft member 38. Here, one end of the guide shaft member 38 is connected to the first plunger 34, and the other end is connected to a locking member 39 such as a bolt that is larger than the through-hole 42b at an outside (opposite side of the standing wall portion 44) of the cam slider 42. Therefore, when moving in this way, the cam slider 42 pulls the guide shaft member 38 in the same direction via the locking member 39, that is, moves the second plunger 35 in the same direction. Since the first plunger 34 is fixed as described above, the second plunger 35 approaches the first plunger 34, and a compression force can be generated between the first plunger 34 and the second plunger 35. The cam driver 40 and the cam slider 42 are examples of cam mechanisms.

The standing wall portion 44 and the cam slider 42 are elastically connected to each other via a coil spring (biasing portion) 46. Accordingly, the cam slider 42 is biased toward the standing wall portion 44.

The first member 10 and the second member 20 are joined by press-fitting in the following procedure.

First, the second member 20 is inserted into the hole portion 12a of the first member 10, the guide shaft member 38 is inserted into the through-hole 32a of the rubber member 32, and the rubber member 32 having the guide shaft member 38 inserted therein is inserted inside the second member 20. In this manner, an assembly 1 in which the first member 10, the second member 20, the rubber member 32, and the guide shaft member 38 are combined is configured. The assembly 1 thus configured is arranged so as to extend horizontally. Next, the first plunger 34 and the second plunger 35 are arranged on both sides of the rubber member 32 in the direction where the guide shaft member 38 extends. At this time, the position of the first plunger 34 is fixed because the first plunger is fixed to the standing wall portion 44, but the second plunger 35 is arranged movably together with the guide shaft member 38. FIG. 1A shows the state at this time.

Next, a vertical force (downward in the figure) is applied with respect to the cam driver 40, the cam driver 40 is moved vertically (downward in the figure), the force is transmitted from the cam driver 40 to the cam slider 42 as described above, and the cam slider 42 is moved horizontally (rightward in the figure). Thus, the force that moves the second plunger 35 in the same direction is applied via the locking member 39 and the guide shaft member 38. The second plunger 35 is thus moved toward the first plunger 34, the rubber member 32 is compressed by the first plunger 34 and the second plunger 35 in the direction where the guide shaft member 38 extends, to expand toward the radially outside the guide shaft member 38, thereby expanding and deforming at least a portion of the second member 20 that is inserted into the hole portion 12a, and joining the second member to the first member 10 by press-fitting. FIG. 1B shows the state at this time.

After the joining by press-fitting, the cam driver 40 of the drive mechanism 36 is moved vertically (upward in the figure) to release the horizontal force (rightward in the figure) applied to the cam slider 42, and the cam slider 42 is returned to its original position by a coil spring 46. Also in the rubber member 32 expanding inside the second member 20, the compression force in the direction where the guide shaft member 38 extends is released, and the state in which the rubber is expanded radially is returned to the natural state, thereby releasing the contact with the second member 20. Therefore, the first member 10 and the second member 20 having been joined by press-fitting can be easily removed from the swaging and joining device 30 without being subjected to a frictional force from the rubber member 32.

The effect of the method for joining members of the present embodiment will be described.

According to the present embodiment, by expanding the rubber member 32 to uniformly expand and deform the second member 20, it is possible to prevent local deformation and reduce the load on each of the members 10 and 20. This is because the second member 20 can be uniformly deformed due to the isotropic deformability of the rubber member 32. Accordingly, the fitting accuracy is improved, and the joining strength can be improved. The above method is also advantageous compared with electromagnetic forming and other processing methods. Electromagnetic forming can only be used for conductive materials and has restriction depending on the coil used in terms of the cross-sectional shape and dimensions as described above. On the other hand, this method does not depend on the material and has no restrictions on the cross-sectional shape and dimensions. Furthermore, electrical equipment requiring a large-capacity capacitor is not necessary, and the two members 10 and 20 can be joined at low cost. In addition, since the above-mentioned assembly 1 is arranged horizontally, it is not difficult to handle the second member 20 such as a long pipe that is difficult to manage. Furthermore, since the first plunger 34 is fixed, applying a force only to the second plunger 35 can compress the rubber member 32 in the direction where the guide shaft member 38 extends, and hence the rubber member 32 can be compressed from both sides by one drive mechanism 36.

According to the present embodiment, the force applied in a vertical direction different from the direction (horizontal direction) where the guide shaft member 38 extends can be converted into a horizontal force by the cam mechanism. Normally, a processing machine such as a press machine that applies a compression force applies a compression force in the vertical direction. The cam mechanism can convert a vertical force applied by a processing machine such as the normal press machine into a horizontal force. In the present embodiment, since the above assembly 1 is arranged horizontally, a processing machine such as the normal press machine can be used owing to the cam mechanism, while preventing the handling of the second member 20 which is long in shape for example, from becoming difficult, so that the assembly 1 can be easily joined. Furthermore, when the second member 20 is a long member, since a limit stroke is defined in a normal facility that vertically applies a compression force, there is a possibility that the swaging and joining cannot be performed due to the limitation of dimensions. However, in the present embodiment, since the cam mechanism can convert the direction where the force acts, the swaging and joining can be performed without being subjected to dimension restriction.

According to the present embodiment, since the second plunger 35 is automatically returned to the original position by the coil spring 46, it is not necessary to manually return the second plunger 35 to the original position, and workability can be improved.

Second Embodiment

Figure 2A:
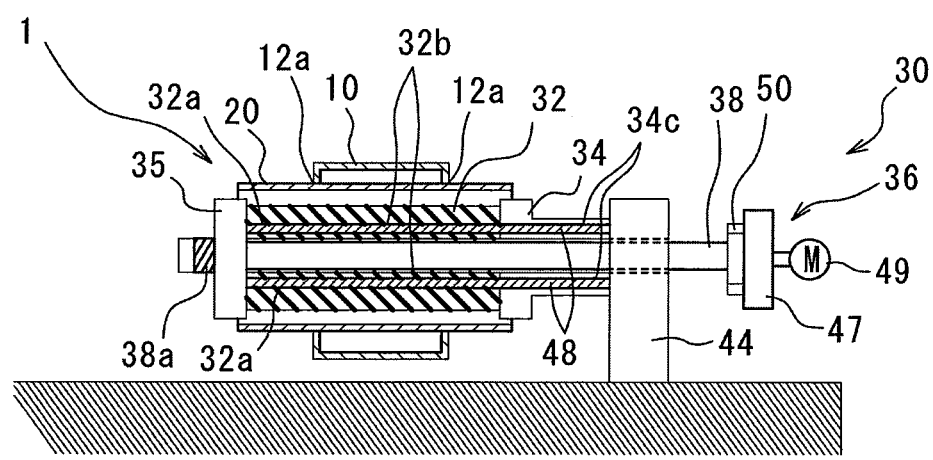
FIG. 2A is a partial sectional view before joining by a method for joining members according to a second embodiment.
Figure 2B:
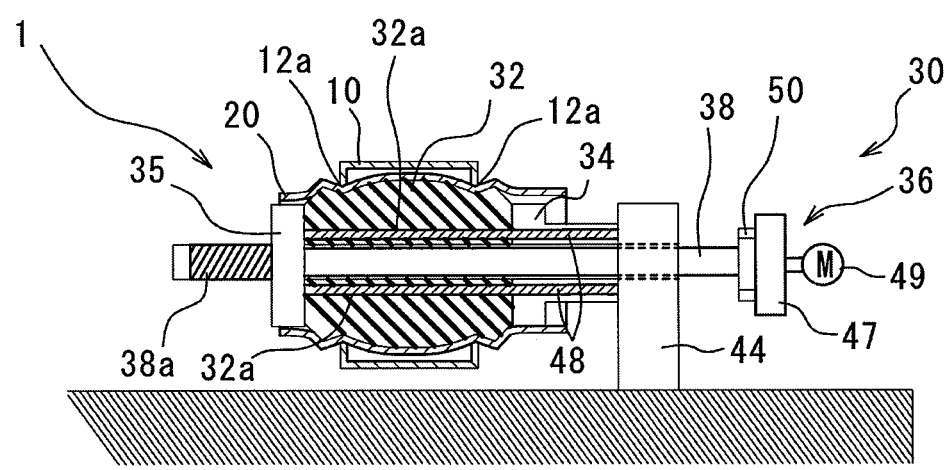
FIG. 2B is a partial sectional view after joining by the method for joining members according to the second embodiment.

The method for swaging and joining of the present embodiment shown in FIGS. 2A and 2B has substantially the same configuration as that of the first embodiment of FIGS. 1A and 1B except for portions related to the drive mechanism 36 and the guide shaft member 38. Accordingly, the same components as those shown in FIGS. 1A and 1B are denoted by the same reference numerals and the description thereof may be omitted.

In the present embodiment, the guide shaft member 38 rotates. In order to apply a rotational torque to the guide shaft member 38, the drive mechanism 36 includes a handle portion 47 and a motor 49 for rotationally driving the handle portion 47. The handle portion 47 is mechanically connected to the motor 49 and is rotationally driven by the motor 49. The guide shaft member 38 is provided with a ball screw structure to be described later between the one end portion of the guide shaft member 38 and the second plunger 35, and the other end portion of the guide shaft member 38 is provided with a grasped portion 50 such as a bolt that enables gripping by the handle portion 47.

In the above ball screw structure, a screw groove 38a is formed in the guide shaft member 38. The second plunger 35 of the present embodiment has a through-hole (not shown) through which the guide shaft member 38 can be inserted, and a corresponding thread (not shown) is formed on the inner surface of the through-hole. In the ball screw structure, two support rods 48 are provided for stopping rotation of the second plunger 35, and the two support rods 48 extend from the standing wall portion 44, penetrate the first plunger 34 and the rubber member 32, and are connected to the second plunger 35. Therefore, the first plunger 34 and the rubber member 32 have two through-holes 34c and 32b respectively corresponding to the penetrating two support rods 48.

When the guide shaft member 38 is rotated by the drive mechanism 36, a rotational torque acts on the second plunger 35 connected to the guide shaft member 38. However, since the second plunger 35 is fixed so as not to be rotatable by the two support rods 48, it moves in accordance with the screw groove 38a of the guide shaft member 38 without rotating, that is, moves horizontally (rightward in the figure) along the guide shaft member 38. Since the position of the first plunger 34 is fixed by the standing wall portion 44, the second plunger 35 approaches the first plunger 34. Accordingly, the first and second plungers 34 and 35 compress the rubber member 32 in the direction where the guide shaft member 38 extends, expands the rubber member in the radial direction of the guide shaft member 38, and expands and deforms the second member 20, thereby joining the first member 10 and the second member 20 by press-fitting.

According to the present embodiment, since the ball screw structure is provided, a rotary drive type can be used as the drive mechanism 36. When a rotary drive type is used as the drive mechanism 36, it is not necessary to secure the stroke length as in a press machine. Accordingly, the second member 20 can be reliably joined regardless of its length, and the swaging and joining device 30 can be reduced in size.

Third Embodiment

Figure 3:
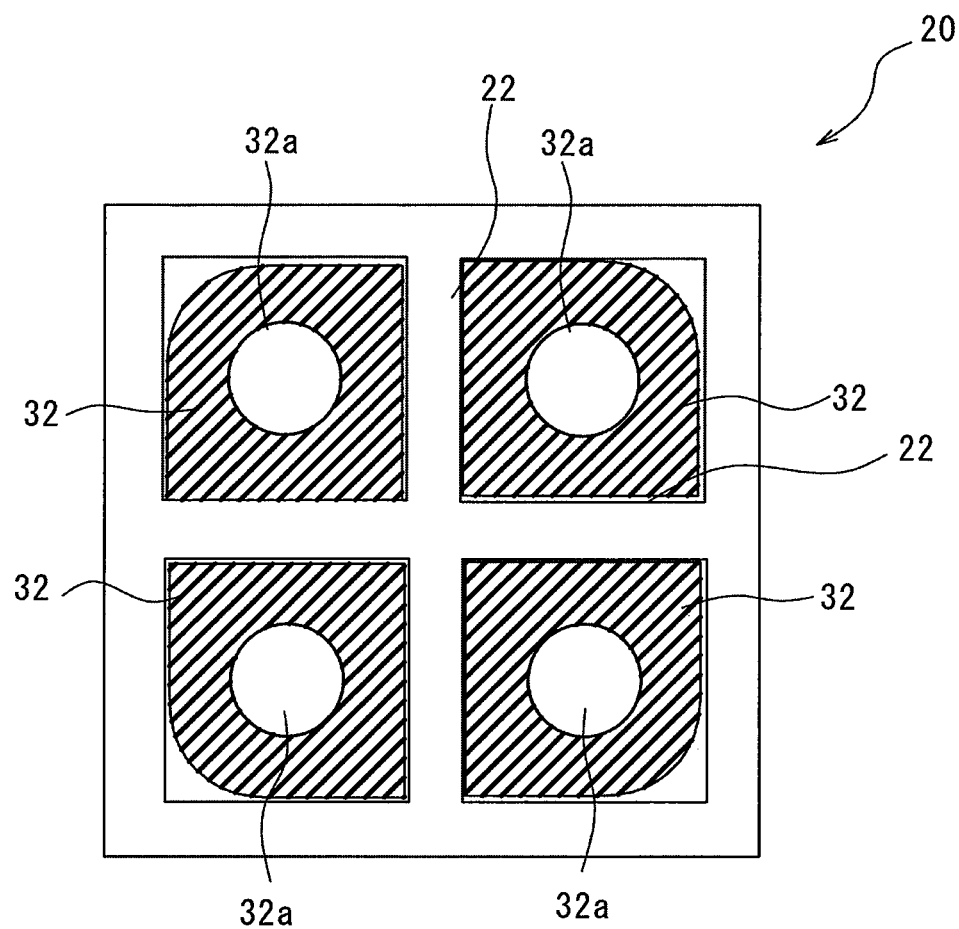
FIG. 3 is a sectional view of a second member and an elastic body in a method for joining members according to a third embodiment.
Figure 4A:
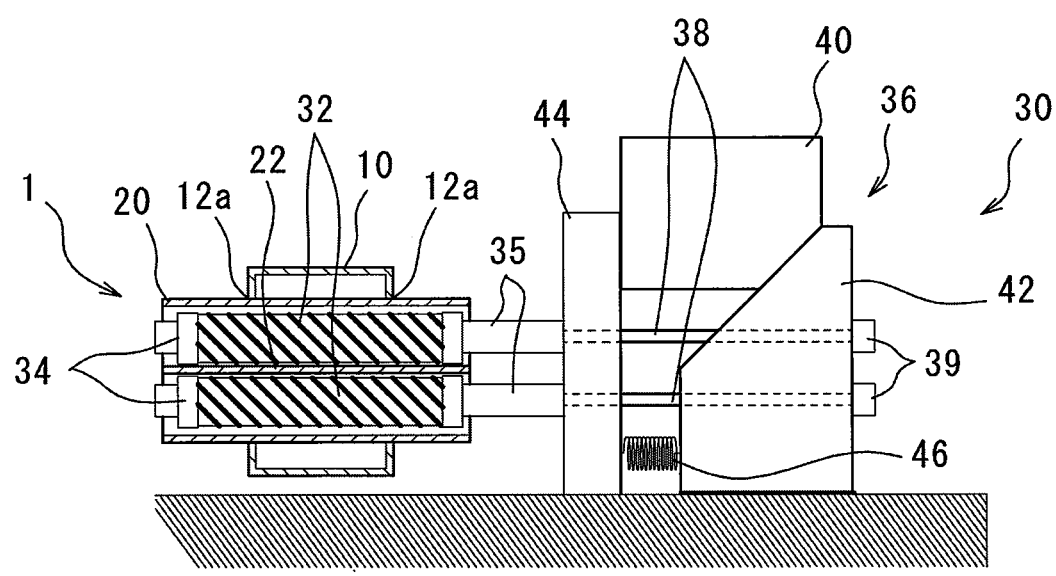
FIG. 4A is a partial sectional view before joining by the method for joining members according to the third embodiment.
Figure 4B:
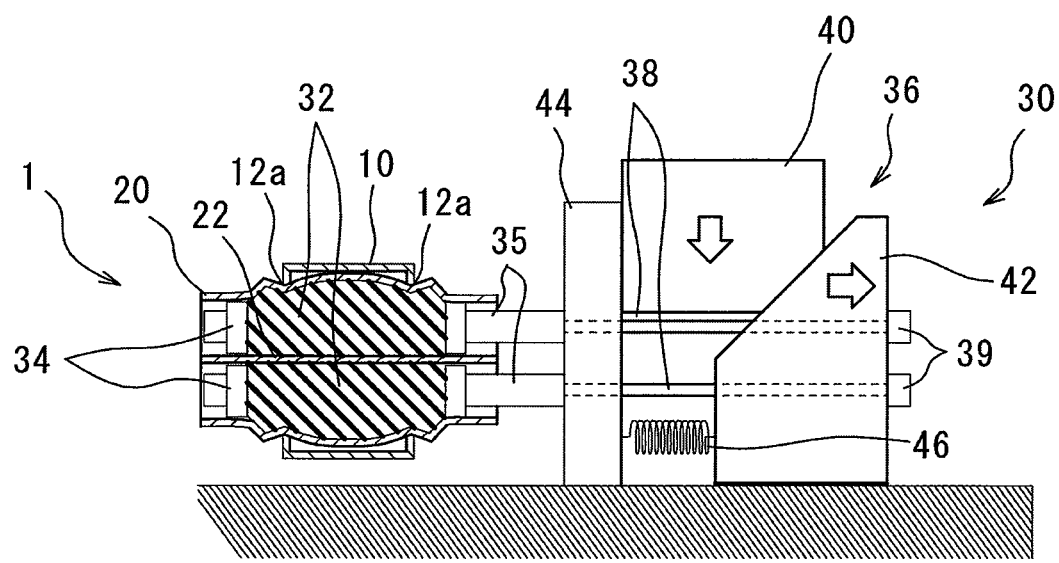
FIG. 4B is a partial sectional view before joining by the method for joining members according to the third embodiment.

The method for swaging and joining of the present embodiment shown in FIGS. 3 to 4B has substantially the same configuration as that of the first embodiment of FIGS. 1A and 1B except for the portion related to a partition wall 22 provided inside the second member 20. Accordingly, the same components as those shown in FIGS. 1A and 1B are denoted by the same reference numerals and the description thereof may be omitted.

In the present embodiment, the partition wall 22 is provided that extends in the longitudinal direction of the second member 20 and partitions the internal space of the second member 20. Together with the partition wall 22, the rubber member 32, the guide shaft member 38, the first plunger 34, and the second plunger 35 are each provided corresponding to the number of the internal spaces partitioned by the partition wall 22. However, the form of the rubber member 32 and the second member 20 can be changed in various ways, and as shown in FIG. 3, the second member 20 may have a cross-shaped partition wall 22 having, for example, a rectangular cross-sectional outline and dividing the internal space into four. In this case, four rubber members 32 and four guide shaft members 38 to be inserted are also required, and similarly, four first plungers 34 and four second plungers 35 are required.

As shown in FIGS. 4A and 4B, in the present embodiment, the plurality of rubber members 32, the plurality of guide shaft members 38, the plurality of first plungers 34, and the plurality of second plungers 35 are provided, but the configuration is substantially the same as that of the present embodiment except for the configuration related to the number. Accordingly, it can be considered that a plurality of methods for joining members of the first embodiment are executed, and the operation is substantially the same as that of the first embodiment. According to the present embodiment, since the plurality of rubber members 32 are used, the possibility of stress concentration is reduced as compared with the first embodiment, the second member 20 can be uniformly expanded and deformed, and the possibility of local deformation can be further reduced.

Fourth Embodiment

The method for swaging and joining of the present embodiment shown in FIGS. 5A to 5E has substantially the same configuration as that of the first embodiment of FIGS. 1A and 1B except for the portion related to a pusher (motion mechanism) 54. Accordingly, the same components as those shown in FIGS. 1A and 1B are denoted by the same reference numerals and the description thereof may be omitted.

FIGS. 5A to 5E show the first to fifth steps of the method for joining members of the present embodiment. In the present embodiment, wheels 42c and 44b are attached to the lower surfaces of the cam slider 42 and the standing wall portion 44, and the cam slider 42 and the standing wall portion 44 can smoothly move horizontally by the wheels 42c and 44b. The cam driver 40 is also horizontally movable by a rail mechanism or the like (not shown).

The pusher 54 is provided on the horizontally outside (opposite side of the standing wall portion 44) of the cam slider 42. The pusher 54 supports the guide shaft member 38 and moves horizontally the guide shaft member 38. The pusher 54 may move the guide shaft member 38 in any method, but the guide shaft member 38 may be fed or pulled using, for example, a motor, a gear, or the like.

The drive mechanism 36 and the standing wall portion 44 can be temporarily fixed with respect to the guide shaft member 38, that is, the drive mechanism 36 and the standing wall portion 44 can move together with the guide shaft member 38. Accordingly, as the guide shaft member 38 is pushed out (see the arrow in FIG. 5B) to the horizontal direction by the pusher 54, the standing wall portion 44, the drive mechanism 36, the first plunger 34, and the second plunger 35 are subjected to the pushing force from the guide shaft member 38. The standing wall portion 44, the drive mechanism 36, the first plunger 34, and the second plunger 35 can move together without horizontally changing their relative positions, that is, the swaging and joining device 30 can horizontally move generally as a whole.

Figure 5A:
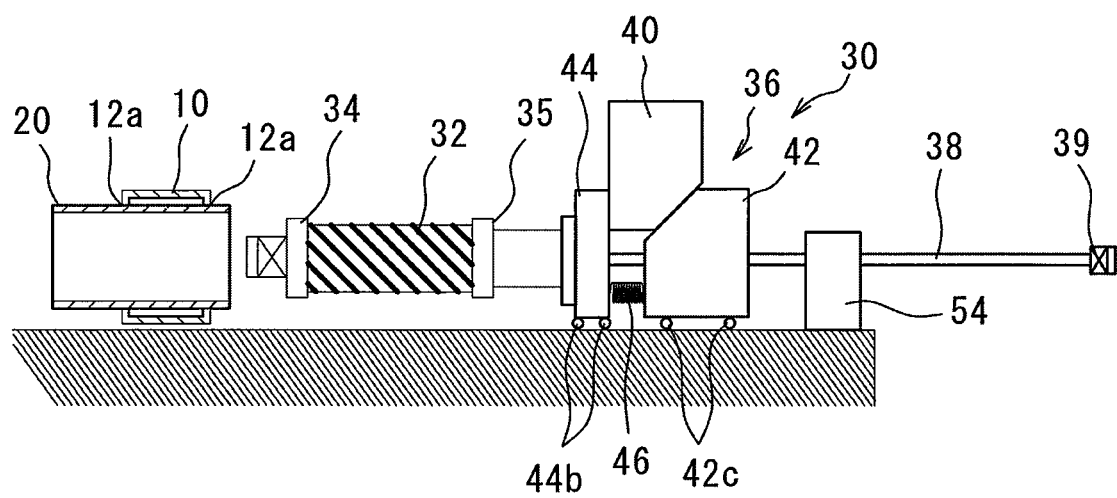
FIG. 5A is a partial sectional view of a first step of a method for joining members according to a fourth embodiment.
Figure 5B:
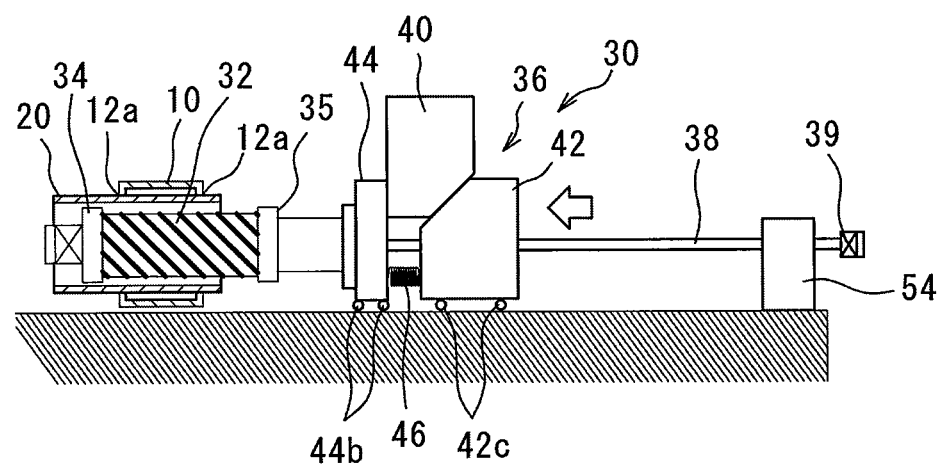
FIG. 5B is a partial sectional view of a second step of the method for joining members according to the fourth embodiment.
Figure 5C:
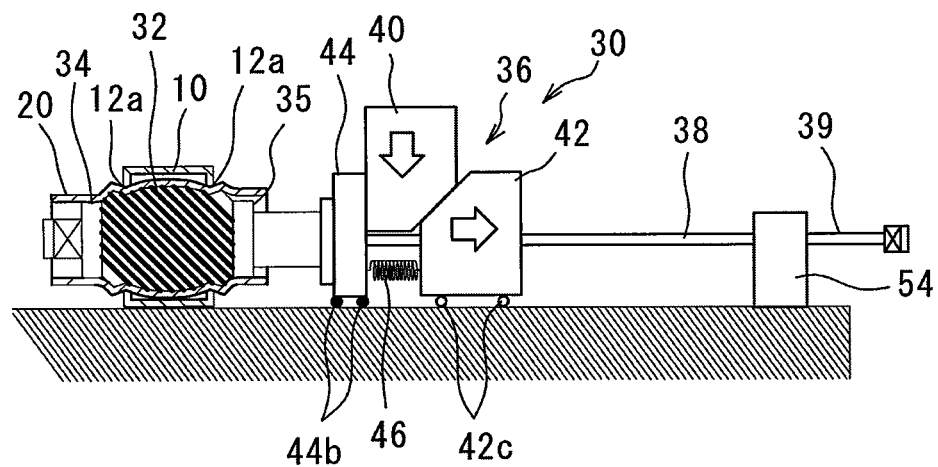
FIG. 5C is a partial sectional view of a third step of the method for joining members according to the fourth embodiment.
Figure 5D:
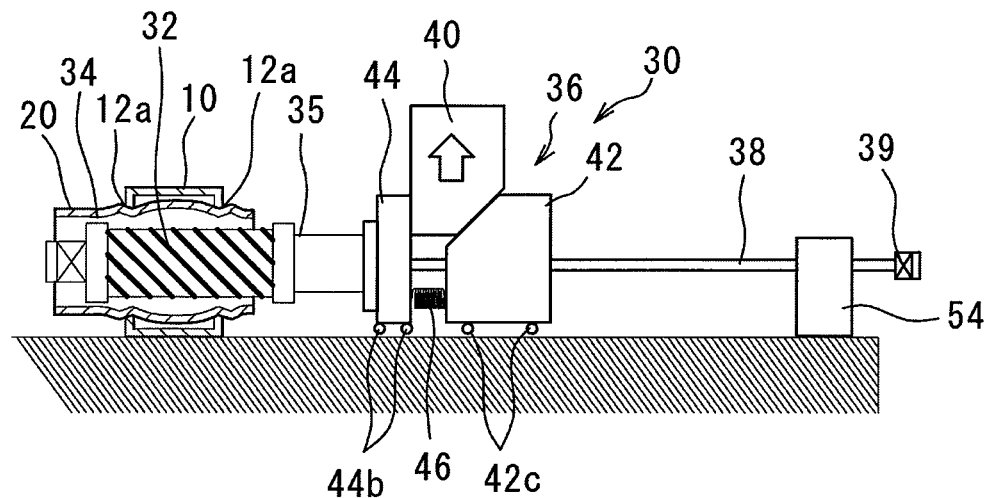
FIG. 5D is a partial sectional view of a fourth step of the method for joining members according to the fourth embodiment.
Figure 5E:
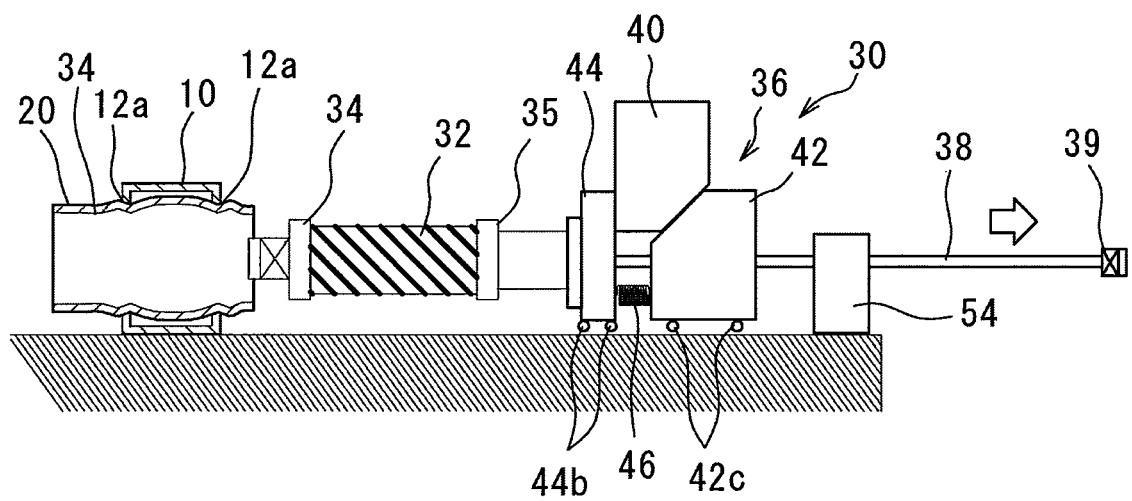
FIG. 5E is a partial sectional view of a fifth step of the method for joining members according to the fourth embodiment.

In the first step shown in FIG. 5A, the second member 20 is inserted through the hole portion 12a of the first member 10. In the second step shown in FIG. 5B, the guide shaft member 38 is horizontally moved by the pusher 54, and the guide shaft member 38 and the rubber member 32 inserted through the guide shaft member 38 are inserted into the second member 20. At this time, the drive mechanism 36 and the standing wall portion 44 are temporarily fixed to the guide shaft member 38, and the swaging and joining device 30 is moved generally as a whole. In the third step shown in FIG. 5C, the drive mechanism 36 moves the cam slider 42 horizontally outside (opposite side of the standing wall portion 44), pulls the guide shaft member 38 in the same direction, and moves the second plunger 35 in the same direction. At this time, the position of the standing wall portion 44 is fixed, and the wheel 44b attached to the lower surface of the standing wall portion 44 is not functioning. Therefore, the position of the first plunger 34 is also fixed, and the second plunger 35 moves so as to approach the first plunger 34. Accordingly, a compression force is applied to the rubber member 32 in the direction where the guide shaft member 38 extends, the rubber member 32 is expanded radially outward of the guide shaft member 38, and the first member 10 and the second member 20 are joined by press-fitting together. In the fourth step shown in FIG. 5D, the compression force applied by the drive mechanism 36 to the rubber member 32 in the direction where the guide shaft member 38 extends is released, so that the rubber member 32 returns to the natural state. In the fifth step shown in FIG. 5E, the swaging and joining device 30 is moved by the pusher 54, and the rubber member 32 is pulled out from the second member 20.

According to the present embodiment, by the pusher 54 horizontally moving the guide shaft member 38, the guide shaft member 38 and the rubber member 32 can be reliably inserted into the second member 20. As a result, it is possible to reduce the difficulty in handling, in particular, the guide shaft member 38 and the rubber member 32 that have a large weight or dimension.

(Various Modifications of Application Objects)

The method for joining members of the first to fourth embodiments described above can be applied to various objects. For example, the first member 10 may be a bumper reinforcement of the vehicle, and the second member 20 may be a bumper stay. Various modifications of the shape of the application object will be described with reference to FIGS. 6A to 10B.

Figure 6A:
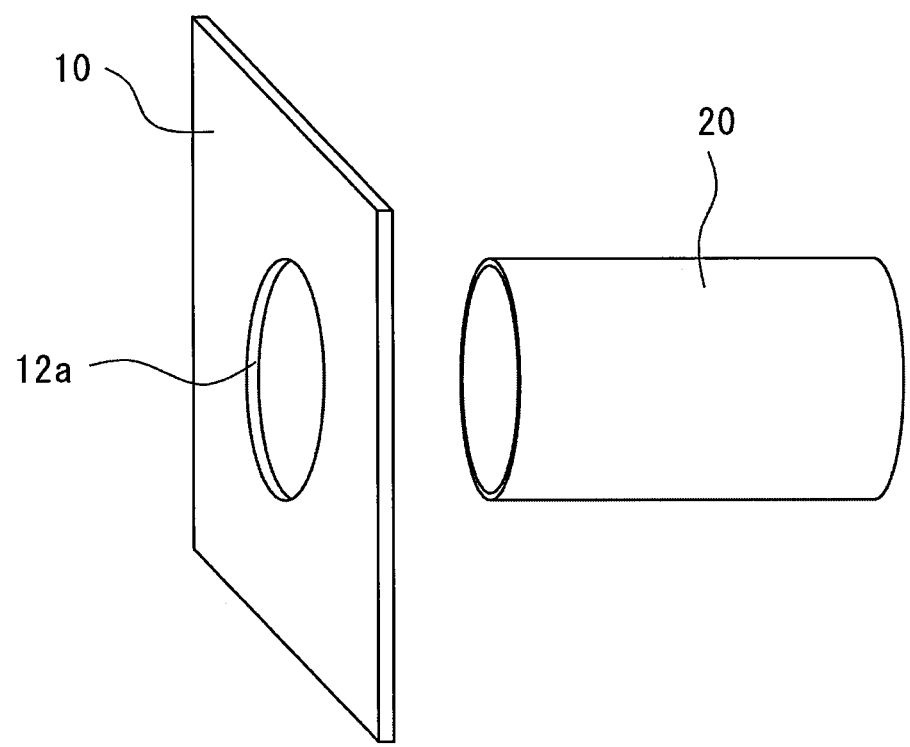
FIG. 6A is a perspective view of a case where the inner shape of a hole portion of a first member and the outer shape of a second member are similar in shape.
Figure 6B:
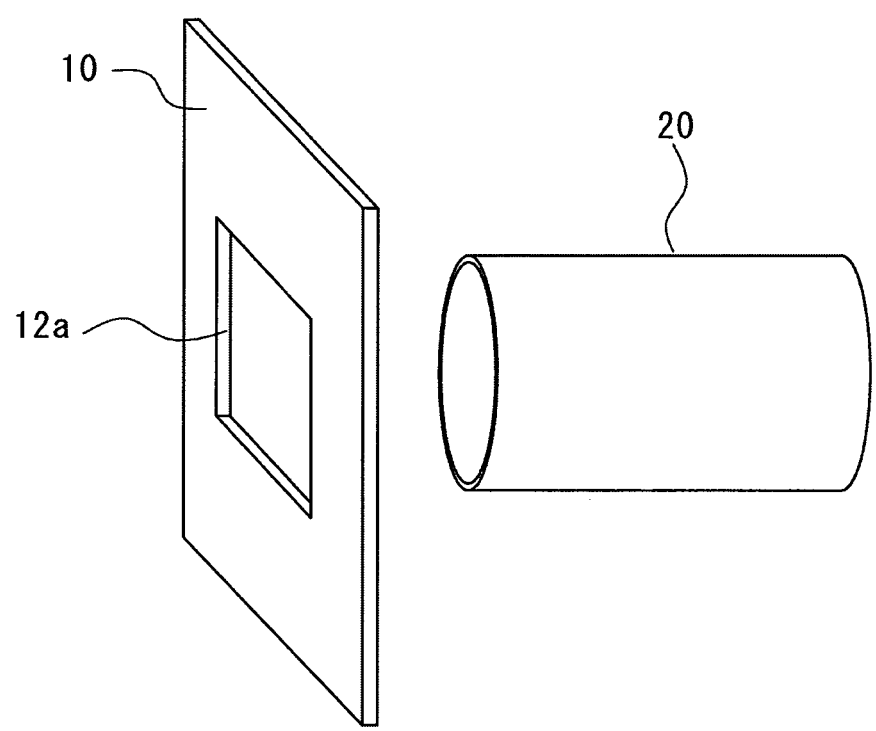
FIG. 6B is a perspective view of a case where the inner shape of the hole portion of the first member and the outer shape of the second member are not similar in shape.

As shown in FIGS. 6A and 6B, the shapes of the first member 10 and the second member 20 can vary. For example, as shown in the figure, the first member 10 may have a plate shape Preferably, as shown in FIG. 6A, the hole portion 12a of the first member 10 and the cross-sectional outline perpendicular to the longitudinal direction of the second member 20 are similar in shape (e.g., both circular). Due to the similar relationship as described above, the second member 20 can be uniformly expanded and deformed to be joined to the first member 10 by press-fitting, and local load on the first member 10 and the second member 20 can be prevented. However, as shown in FIG. 6B, the present invention is also applicable to the case where the hole portion 12a of the first member 10 and the cross-sectional outline of the second member 20 are not similar in shape (e.g., in a case of a circle and a square).

Figure 7A:
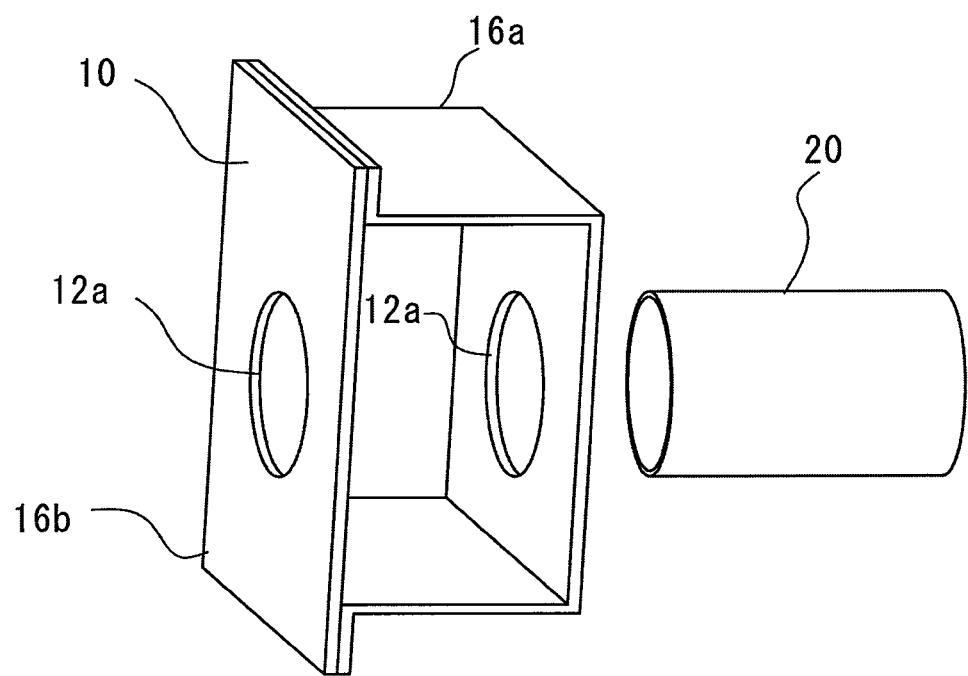
FIG. 7A is a perspective view before swaging and joining when the first member is a hat type.
Figure 7B:
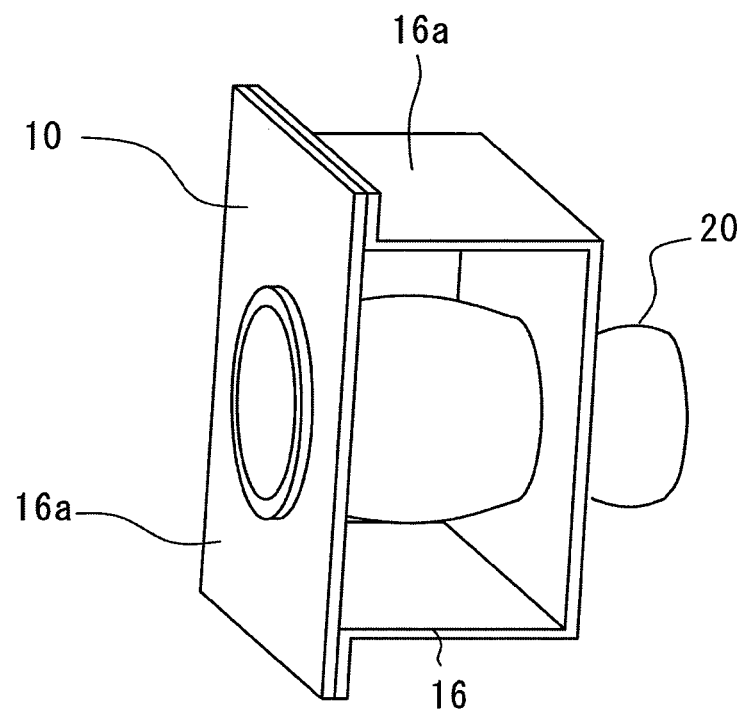
FIG. 7B is a perspective view after swaging and joining when the first member is the hat type.

As shown in FIGS. 7A and 7B, the first member 10 can also have a hat shape. That is, the first member 10 may include a channel portion 16a having a channel shape and a plate-like lid portion 16b joined to the channel portion 16a by welding or the like.

Figure 8A:
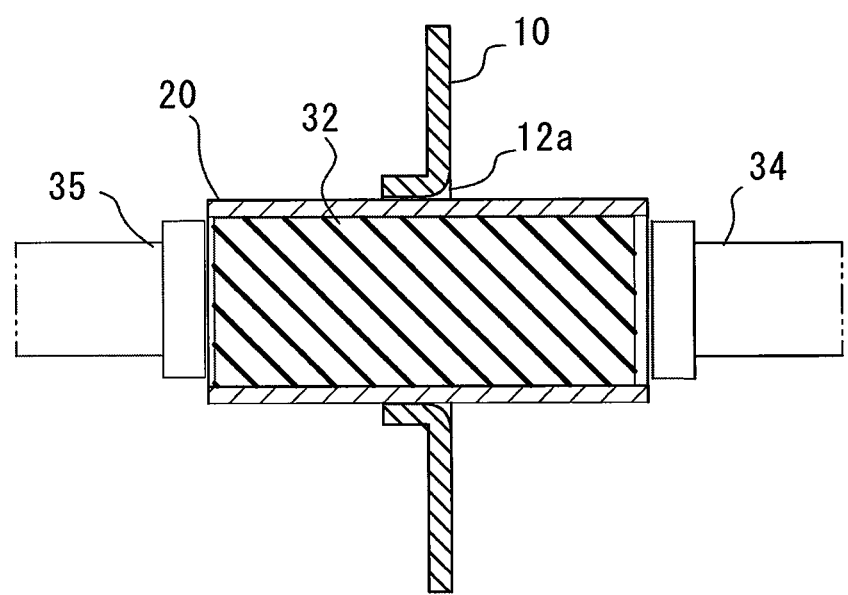
FIG. 8A is a partial sectional view before swaging and joining of the first member to which burring is performed.
Figure 8B:
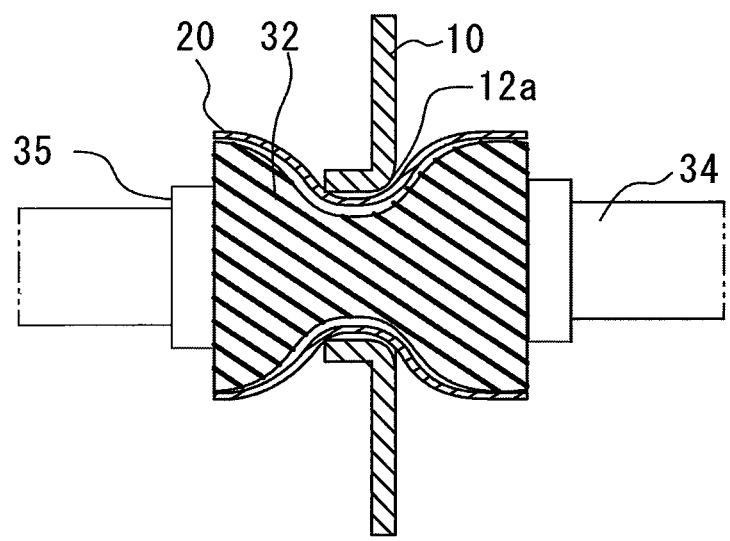
FIG. 8B is a partial sectional view after swaging and joining of the first member to which burring is performed.

As shown in FIGS. 8A and 8B, the hole portion 12a of the first member 10 may be burred. Since the strength of the hole portion 12a of the first member 10 can be improved by burring the edge of the hole portion 12a of the first member 10, deformation of the first member 10 can be prevented, and damage of the second member 20 due to deformation of the first member 10 can be prevented. In addition, since the joining area is increased by the burring, the joining strength can be improved.

Figure 9A:
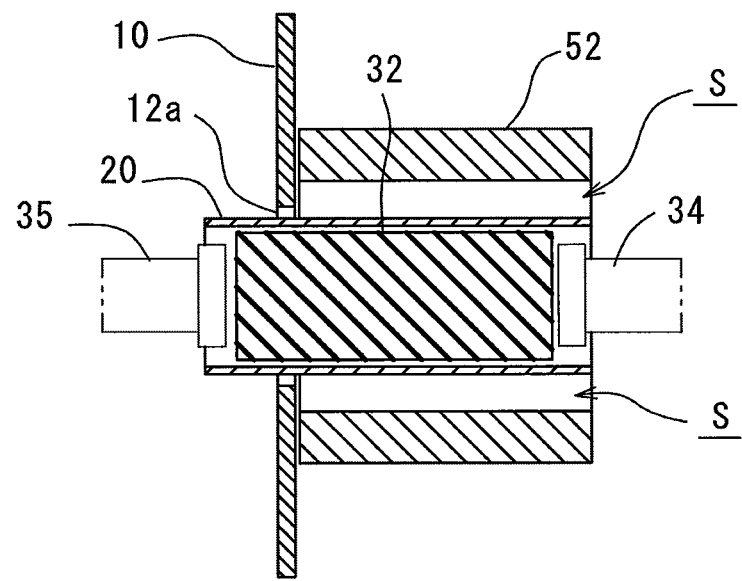
FIG. 9A is a view before swaging and joining in a case where an outer frame mold is arranged outside the second member.
Figure 9B:
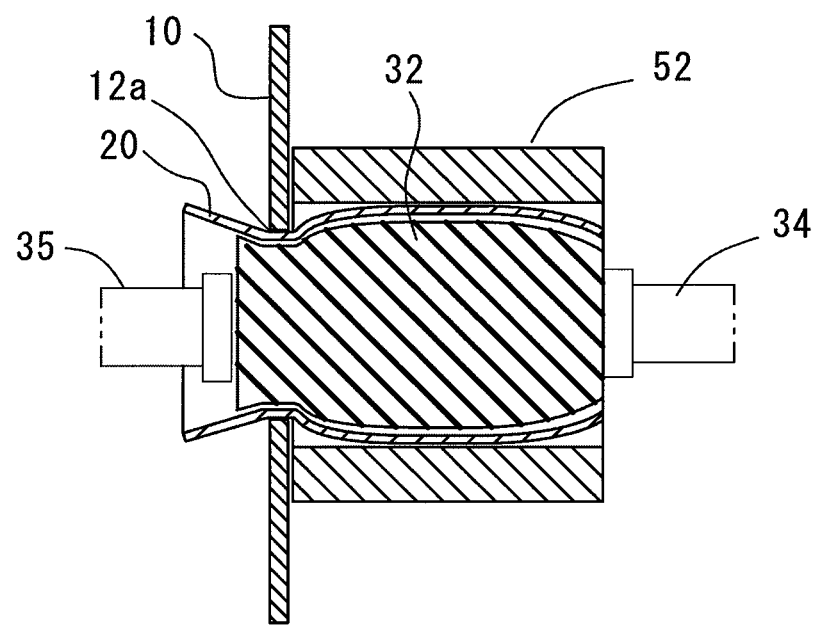
FIG. 9B is a view after swaging and joining in a case where the outer frame mold is arranged outside the second member.

As shown in FIGS. 9A and 9B, the first member 10 and the second member 20 may be joined together by press-fitting using an outer frame mold 52. The outer frame mold 52 of this modification has a cylindrical shape concentric with the second member 20, but the outer frame mold may have any other shape. The outer frame mold 52 is arranged radially outside the second member 20. As shown in FIG. 9A, before the rubber member 32 is compressed horizontally and expanded radially outward, a gap S is provided between the second member 20 and the outer frame mold 52. From this state, as shown in FIG. 9B, the rubber member 32 is compressed in the longitudinal direction of the second member 20 by the first plunger 34 and the second plunger 35 and expanded radially outward, whereby the second member 20 is formed along the outer frame mold 52 and joined by press-fitting. Thus, the outer shape of the second member 20 can be deformed to an arbitrary shape by using the outer frame mold 52 having various inner shapes. The shape to be deformed can be appropriately selected from the viewpoint of component performance, and can be deformed into a shape in accordance with the application.

Figure 10A:
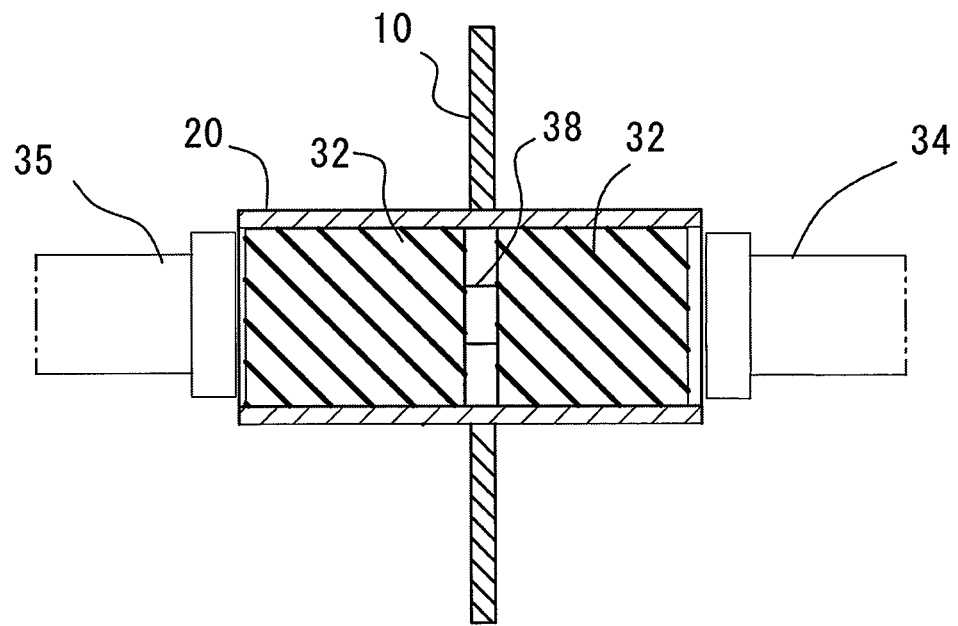
FIG. 10A is a partial sectional view before swaging and joining in a case where a rubber member at a joint portion between the first member and the second member is separated.
Figure 10B:
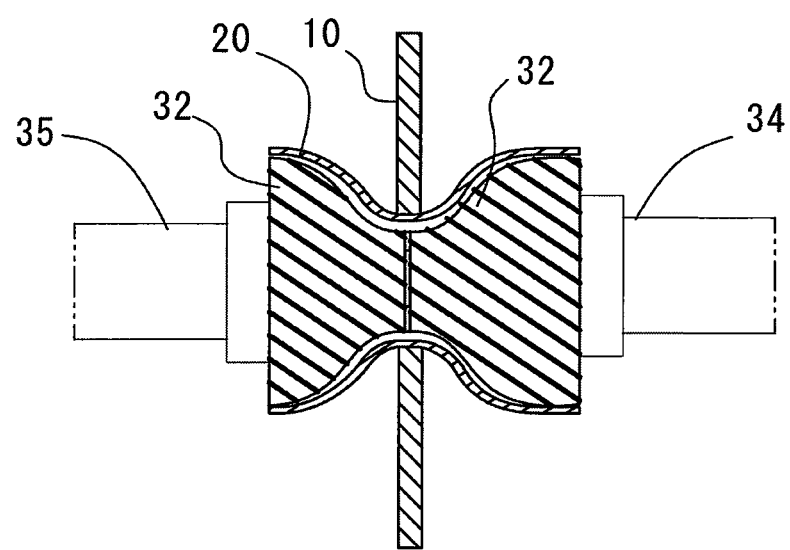
FIG. 10B is a partial sectional view after swaging and joining in a case where a rubber member at a joint portion between the first member and the second member is separated.

As shown in FIGS. 10A and 10B, the rubber member 32 may be separated near the hole portion 12a (i.e., joint portion). As a result, since the rubber member 32 is separated near the joint portion, an unintended deformation of the joint portion can be prevented. The unintended deformation means a deformation of the first member 10. In the joining by press-fitting, the second member 20 is expanded, deformed, and pressed against the first member 10. At this time, the first member 10 may be deformed by being subjected to a force from the second member 20. That is, it is preferable that the first member 10 is not subjected to a force at the joint portion. Therefore, as in the above method, by separating the rubber member 32 so that the rubber member 32 is not arranged near the joint portion, the second member 20 is less likely to be subjected to the expansion and deformation force from the rubber member 32 near the joint portion, and is less likely to expand and deform near the joint portion. Accordingly, the first member 10 is less likely to be subjected to the force from the second member 20 near the joint portion, and the shape of the joint portion can be maintained.

Although specific embodiments of the present invention and modifications thereof have been described above, the present invention is not limited to the above-described embodiments, and various modifications can be made within the scope of the present invention. For example, an appropriate combination of the contents of the individual embodiments and the modifications may be used as an embodiment of the present invention.

The invention claimed is:

1. A method for joining members, the method comprising:
providing a first member that is provided with a hole portion, a second member that is hollow in shape, a guide shaft member, an elastic body that has a through-hole through which the guide shaft member can be inserted, a first plunger that has a through-hole through which the guide shaft member can be inserted, a second plunger to which the guide shaft member is connected, and a drive mechanism that drives the guide shaft member;
inserting the second member into the hole portion of the first member;
inserting the guide shaft member into the through-hole of the elastic body;
inserting the elastic body, into which the guide shaft member is inserted, inside the second member;
arranging an assembly in which the first member, the second member, the elastic body, and the guide shaft member are combined so as to horizontally extend;
arranging the assembly so as to be sandwiched by the first plunger and the second plunger in a direction where the guide shaft member extends; and
moving the second plunger connected to the guide shaft member toward the first plunger by driving the guide shaft member by the drive mechanism in a state where the first plunger is fixed, compressing the elastic body by the first plunger and the second plunger in the direction where the guide shaft member extends, and expanding the elastic body radially outside the guide shaft member, thereby expanding and deforming at least a portion of the second member that is inserted into the hole portion to join the second member to the first member by press-fitting, wherein:
the drive mechanism further includes a cam mechanism that converts a force applied in a direction different from the direction where the guide shaft member extends into a force in the direction where the guide shaft member extends; and
the drive mechanism compresses the elastic body with the force whose direction has been converted by the cam mechanism.

2. The method for joining members according to claim 1, wherein:
the drive mechanism includes a biasing portion that bias the guide shaft member and the second plunger in a direction where compression of the elastic body is released; and
when a drive force of the guide shaft member generated by the drive mechanism is released after the compression of the elastic body, the guide shaft member and the second plunger are returned to positions before the compression by a biasing force of the biasing portion.

3. The method for joining members according to claim 1, wherein:
- a ball screw structure is provided between the guide shaft member and the second plunger, and
- the drive mechanism moves the second plunger toward the first plunger with the ball screw structure by rotating and driving the guide shaft member.

4. The method for joining members according to claim 1, wherein:
- a motion mechanism that horizontally moves the guide shaft member is further provided; and
- the motion mechanism horizontally moves the guide shaft member, so that the guide shaft member and the elastic body are inserted inside the second member.

5. The method for joining members according to claim 1, wherein an inner shape of the hole portion of the first member and an outer shape of the second member are similar in shape.

6. The method for joining members according to claim 1, wherein an outer frame mold is arranged outside the second member, and at least a part of the second member is formed along the outer frame mold to be joined by press-fitting.

7. The method for joining members according to claim 1, wherein the elastic body is separated at a joint portion between the first member and the second member.

8. A method for joining members, the method comprising:
- providing a first member that is provided with a hole portion, a second member that is hollow in shape, a guide shaft member, an elastic body that has a through-hole through which the guide shaft member can be inserted, a first plunger that has a through-hole through which the guide shaft member can be inserted, a second plunger to which the guide shaft member is connected, and a drive mechanism that drives the guide shaft member;
- inserting the second member into the hole portion of the first member;
- inserting the guide shaft member into the through-hole of the elastic body;
- inserting the elastic body, into which the guide shaft member is inserted, inside the second member;
- arranging an assembly in which the first member, the second member, the elastic body, and the guide shaft member are combined so as to horizontally extend;
- arranging the assembly so as to be sandwiched by the first plunger and the second plunger in a direction where the guide shaft member extends; and
- moving the second plunger connected to the guide shaft member toward the first plunger by driving the guide shaft member by the drive mechanism in a state where the first plunger is fixed, compressing the elastic body by the first plunger and the second plunger in the direction where the guide shaft member extends, and expanding the elastic body radially outside the guide shaft member, thereby expanding and deforming at least a portion of the second member that is inserted into the hole portion to join the second member to the first member by press-fitting, wherein:
- the second member is provided with a partition wall that extends in a longitudinal direction of the second member and partitions an internal space of the second member; and
- the elastic body, the guide shaft member, the first plunger, and the second plunger are provided each corresponding to the number of the internal spaces partitioned by the partition wall.

9. The method for joining members according to claim 8, wherein:
- the drive mechanism includes a biasing portion that bias the guide shaft member and the second plunger in a direction where compression of the elastic body is released; and
- when a drive force of the guide shaft member generated by the drive mechanism is released after the compression of the elastic body, the guide shaft member and the second plunger are returned to positions before the compression by a biasing force of the biasing portion.

10. The method for joining members according to claim 8, wherein:
- a ball screw structure is provided between the guide shaft member and the second plunger, and
- the drive mechanism moves the second plunger toward the first plunger with the ball screw structure by rotating and driving the guide shaft member.

11. The method for joining members according to claim 8, wherein:
- a motion mechanism that horizontally moves the guide shaft member is further provided; and
- the motion mechanism horizontally moves the guide shaft member, so that the guide shaft member and the elastic body are inserted inside the second member.

12. The method for joining members according to claim 8, wherein an inner shape of the hole portion of the first member and an outer shape of the second member are similar in shape.

13. The method for joining members according to claim 8, wherein an outer frame mold is arranged outside the second member, and at least a part of the second member is formed along the outer frame mold to be joined by press-fitting.

14. The method for joining members according to claim 8, wherein the elastic body is separated at a joint portion between the first member and the second member.

15. A device for joining members, the device using an elastic body that has a through-hole to join a first member that is provided with a hole portion and a second member that is hollow in shape by press-fitting, the device comprising:
- a guide shaft member that can be inserted into the through-hole of the elastic body;
- a first plunger that has a through-hole through which the guide shaft member is inserted, the first plunger having a fixed position and a first pressing surface with a flat shape;
- a second plunger that is connected to the guide shaft member, the second plunger having a movable position and a second pressing surface that has a flat shape and is opposed to the first pressing surface; and
- a drive mechanism that drives the guide shaft member to move the second plunger toward the first plunger, wherein
- the drive mechanism further includes a cam mechanism that converts a force applied in a direction different from the direction where the guide shaft member extends into a force in the direction where the guide shaft member extends; and
- the drive mechanism compresses the elastic body with the force whose direction has been converted by the cam mechanism.

\* \* \* \* \*